(12) United States Patent
Connor (10) Patent No.: US 8,543,381 B2
(45) Date of Patent: *Sep. 24, 2013

(54) MORPHING TEXT BY SPLICING END-COMPATIBLE SEGMENTS

(75) Inventor: Robert A. Connor, Minneapolis, MN (US)

(73) Assignee: Holovisions LLC, Forest Lake, MN (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/802,935

(22) Filed: Jun. 17, 2010

(65) Prior Publication Data

US 2011/0184726 A1    Jul. 28, 2011

Related U.S. Application Data

(60) Provisional application No. 61/336,757, filed on Jan. 25, 2010, provisional application No. 61/336,758, filed on Jan. 25, 2010, provisional application No. 61/336,759, filed on Jan. 25, 2010.

(51) Int. Cl.
    *G06F 17/27*    (2006.01)

(52) U.S. Cl.
    USPC ............... 704/9; 704/2; 704/3; 704/4; 704/5; 704/6; 704/7; 704/8; 704/270; 704/272

(58) Field of Classification Search
    USPC .................................... 704/1–9, 270
    See application file for complete search history.

(56) References Cited

U.S. PATENT DOCUMENTS

| | | | |
|---|---|---|---|
| 4,456,973 A | 6/1984 | Carlgren et al. | |
| 4,773,039 A * | 9/1988 | Zamora | 715/256 |
| 5,056,021 A * | 10/1991 | Ausborn | 704/9 |
| 5,708,825 A | 1/1998 | Sotomayor | |
| 5,717,913 A | 2/1998 | Driscoll | |
| 5,953,718 A | 9/1999 | Wical | |
| 6,269,368 B1 | 7/2001 | Diamond | |
| 6,289,337 B1 | 9/2001 | Davies et al. | |
| 6,389,409 B1 | 5/2002 | Horovitz et al. | |
| 6,493,663 B1 * | 12/2002 | Ueda | 704/9 |
| 6,542,889 B1 | 4/2003 | Aggarwal et al. | |
| 6,612,844 B1 * | 9/2003 | Vallee | 434/156 |
| 6,632,251 B1 | 10/2003 | Rutten et al. | |
| 6,651,058 B1 * | 11/2003 | Sundaresan et al. | 1/1 |
| 6,701,309 B1 * | 3/2004 | Beeferman et al. | 1/1 |
| 6,721,728 B2 * | 4/2004 | McGreevy | 1/1 |
| 6,757,692 B1 | 6/2004 | Davis et al. | |
| 6,847,966 B1 | 1/2005 | Sommer et al. | |
| 6,865,572 B2 | 3/2005 | Boguraev et al. | |

(Continued)

*Primary Examiner* — Pierre-Louis Desir
*Assistant Examiner* — Fariba Sirjani (57) ABSTRACT

This invention is a method for "text morphing," wherein text morphing involves integrating or blending together substantive content from two or more bodies of text into a single body of text based on locations of linguistic commonality among the two or more bodies of text. This method entails: identifying pairs of "Synonym-Different-Synonym" (SDS) text segments between an import body of text and an export body of text; and, for each selected pair of SDS text segments, substituting some or all of the SDS text segment from the export body of text for some or all of the SDS text segment in the import body of text. In some respects, this method is analogous to splicing and substituting gene segments with compatible starting and ending sequences, but different middle sequences. Text morphing as disclosed herein can be useful for creative ideation, product development, integrative search engines, and entertainment purposes.

8 Claims, 3 Drawing Sheets

(56) References Cited

U.S. PATENT DOCUMENTS

| | | | |
|---|---|---|---|
| 6,882,971 B2* | 4/2005 | Craner | 704/246 |
| 6,895,380 B2* | 5/2005 | Sepe, Jr. | 704/275 |
| 6,970,859 B1 | 11/2005 | Brechner et al. | |
| 7,003,516 B2 | 2/2006 | Dehlinger et al. | |
| 7,035,789 B2* | 4/2006 | Abrego et al. | 704/9 |
| 7,062,487 B1 | 6/2006 | Nagaishi et al. | |
| 7,113,943 B2 | 9/2006 | Bradford et al. | |
| 7,124,362 B2 | 10/2006 | Tischer | |
| 7,167,824 B2 | 1/2007 | Kalulli | |
| 7,167,825 B1* | 1/2007 | Potter | 704/9 |
| 7,171,351 B2* | 1/2007 | Zhou | 704/9 |
| 7,231,343 B1* | 6/2007 | Treadgold et al. | 704/9 |
| 7,231,379 B2 | 6/2007 | Parikh et al. | |
| 7,231,393 B1 | 6/2007 | Harik et al. | |
| 7,260,567 B2 | 8/2007 | Parikh et al. | |
| 7,292,972 B2 | 11/2007 | Lin et al. | |
| 7,296,009 B1 | 11/2007 | Jiang et al. | |
| 7,366,711 B1 | 4/2008 | McKeown et al. | |
| 7,370,056 B2 | 5/2008 | Parikh et al. | |
| 7,401,077 B2 | 7/2008 | Bobrow et al. | |
| 7,472,343 B2 | 12/2008 | Vasey | |
| 7,480,642 B2 | 1/2009 | Koono et al. | |
| 7,487,081 B2* | 2/2009 | Shimomura et al. | 704/4 |
| 7,496,621 B2 | 2/2009 | Pan et al. | |
| 7,499,934 B2 | 3/2009 | Zhang et al. | |
| 7,548,913 B2 | 6/2009 | Ekberg et al. | |
| 7,567,976 B1 | 7/2009 | Betz et al. | |
| 7,580,921 B2* | 8/2009 | Patterson | 1/1 |
| 7,580,929 B2* | 8/2009 | Patterson | 1/1 |
| 7,584,175 B2* | 9/2009 | Patterson | 1/1 |
| 7,587,309 B1 | 9/2009 | Rohrs et al. | |
| 7,587,387 B2 | 9/2009 | Hogue | |
| 7,599,831 B2* | 10/2009 | Ford | 704/9 |
| 7,599,899 B2 | 10/2009 | Rehberg et al. | |
| 7,599,914 B2* | 10/2009 | Patterson | 1/1 |
| 7,599,930 B1* | 10/2009 | Burns et al. | 1/1 |
| 7,627,548 B2* | 12/2009 | Riley et al. | 1/1 |
| 7,627,562 B2* | 12/2009 | Kacmarcik et al. | 1/1 |
| 7,627,809 B2 | 12/2009 | Balinsky | |
| 7,630,980 B2 | 12/2009 | Parikh | |
| 7,634,462 B2* | 12/2009 | Weyand et al. | 1/1 |
| 7,636,714 B1* | 12/2009 | Lamping et al. | 1/1 |
| 7,640,158 B2* | 12/2009 | Detlef et al. | 704/235 |
| 7,689,899 B2 | 3/2010 | Leymaster et al. | |
| 7,721,201 B2 | 5/2010 | Grigoriadis et al. | |
| 7,752,034 B2* | 7/2010 | Brockett et al. | 704/9 |
| 7,788,085 B2* | 8/2010 | Brun et al. | 704/9 |
| 7,827,026 B2* | 11/2010 | Brun et al. | 704/2 |
| 7,890,860 B1* | 2/2011 | Thrasher et al. | 715/260 |
| 7,937,265 B1* | 5/2011 | Pasca et al. | 704/9 |
| 7,937,396 B1* | 5/2011 | Pasca et al. | 707/750 |
| 7,970,616 B2* | 6/2011 | Dapkunas | 704/270 |
| 8,019,595 B1* | 9/2011 | Kinder | 704/9 |
| 8,161,073 B2* | 4/2012 | Connor | 707/791 |
| 8,209,268 B2* | 6/2012 | Zelenko | 706/12 |
| 8,374,871 B2* | 2/2013 | Ehsani et al. | 704/257 |
| 8,473,279 B2* | 6/2013 | Al-Shammari | 704/9 |
| 2002/0107896 A1* | 8/2002 | Ronai | 707/530 |
| 2003/0040899 A1* | 2/2003 | Ogilvie | 704/2 |
| 2003/0069880 A1* | 4/2003 | Harrison et al. | 707/3 |
| 2004/0030540 A1* | 2/2004 | Ovil et al. | 704/1 |
| 2004/0199498 A1* | 10/2004 | Kapur et al. | 707/3 |
| 2005/0027691 A1* | 2/2005 | Brin et al. | 707/3 |
| 2005/0034071 A1* | 2/2005 | Musgrove et al. | 715/530 |
| 2005/0149499 A1* | 7/2005 | Franz et al. | 707/3 |
| 2005/0154580 A1* | 7/2005 | Horowitz et al. | 704/9 |
| 2005/0256848 A1* | 11/2005 | Alpert et al. | 707/3 |
| 2006/0190804 A1* | 8/2006 | Yang | 715/500 |
| 2006/0206474 A1* | 9/2006 | Kapur et al. | 707/5 |
| 2006/0253431 A1 | 11/2006 | Bobick et al. | |
| 2007/0043761 A1* | 2/2007 | Chim et al. | 707/102 |
| 2007/0100823 A1* | 5/2007 | Inmon | 707/6 |
| 2007/0106937 A1* | 5/2007 | Cucerzan et al. | 715/533 |
| 2007/0166684 A1* | 7/2007 | Walker | 434/322 |
| 2007/0233458 A1* | 10/2007 | Sakao et al. | 704/9 |
| 2008/0114721 A1* | 5/2008 | Jones et al. | 707/2 |
| 2008/0312927 A1* | 12/2008 | Constantin | 704/251 |
| 2009/0018990 A1 | 1/2009 | Moraleda | |
| 2009/0024606 A1 | 1/2009 | Schilit et al. | |
| 2009/0055394 A1 | 2/2009 | Schilit et al. | |
| 2009/0083027 A1 | 3/2009 | Hollingsworth | |
| 2009/0094137 A1 | 4/2009 | Toppenberg et al. | |
| 2009/0158137 A1* | 6/2009 | Ittycheriah et al. | 715/234 |
| 2009/0193011 A1 | 7/2009 | Blair-Goldensohn et al. | |
| 2009/0216738 A1 | 8/2009 | Dexter et al. | |
| 2009/0216764 A1 | 8/2009 | Dexter | |
| 2009/0217159 A1* | 8/2009 | Dexter et al. | 715/271 |
| 2009/0217168 A1 | 8/2009 | Dexter et al. | |
| 2009/0292719 A1 | 11/2009 | Lachtarnik et al. | |
| 2009/0313233 A1* | 12/2009 | Hanazawa | 707/5 |
| 2009/0313243 A1 | 12/2009 | Buitelaar et al. | |
| 2010/0036838 A1 | 2/2010 | Ellis | |
| 2010/0057710 A1* | 3/2010 | Kanungo et al. | 707/5 |
| 2010/0070448 A1 | 3/2010 | Omoigui | |
| 2010/0332217 A1* | 12/2010 | Wintner et al. | 704/9 |
| 2011/0184725 A1* | 7/2011 | Connor | 704/9 |
| 2011/0184726 A1* | 7/2011 | Connor | 704/9 |
| 2011/0184727 A1* | 7/2011 | Connor | 704/9 |
| 2011/0276599 A1* | 11/2011 | Connor | 707/780 |
| 2011/0307497 A1* | 12/2011 | Connor | 707/749 |
| 2011/0313756 A1* | 12/2011 | Connor | 704/9 |
| 2011/0313992 A1* | 12/2011 | Groeneveld et al. | 707/706 |
| 2012/0143593 A1* | 6/2012 | Wu et al. | 704/2 |
| 2012/0303358 A1* | 11/2012 | Ducatel et al. | 704/9 |
| 2012/0310643 A1* | 12/2012 | Labsky et al. | 704/235 |
| 2012/0316867 A1* | 12/2012 | Hogan et al. | 704/9 |
| 2013/0080886 A1* | 3/2013 | Anderson | 715/256 |

* cited by examiner

Fig. 1 key: = means identical
△ means substitution

MORPHING TEXT BY SPLICING END-COMPATIBLE SEGMENTS

CROSS-REFERENCE TO RELATED APPLICATIONS

This patent application claims the priority benefits of: U.S. Provisional Patent Application 61/336757 entitled "Morphing Text Style" filed on Jan. 25, 2010 by Robert A. Connor; U.S. Provisional Patent Application 61/336758 entitled "Morphing Text by Splicing End-Compatible Segments" filed on Jan. 25, 2010 by Robert A. Connor; and U.S. Provisional Patent Application 61/336759 entitled "Multi-Stage Text Morphing" filed on Jan. 25, 2010 by Robert A. Connor.

FEDERALLY SPONSORED RESEARCH

Not Applicable

SEQUENCE LISTING OR PROGRAM

Not Applicable

FIELD OF INVENTION

This invention relates to word processing, text processing, and information search.

Introduction to Text Morphing

The term "text morphing," as used herein, is the integration or blending together of substantive content from two or more bodies of text into a single body of text based on locations of linguistic commonality among the two or more bodies of text. In some respects, this "text morphing" may be viewed as the text-based version of "image morphing" in which two or more images are integrated or blended together based on locations of image subject commonality among the two or more images. The meaning of the term "text morphing" as used herein is different from its occasional use in the prior art in reference to incremental video-graphic transition of text letters from one word (or phrase) to another word (or phrase).

The method of text morphing that is disclosed has several useful applications. For example, text morphing can synthesize novel concepts and expressions that, when interacted with human imagination, can create useful ideas, creative works, and products. Sometimes a stroke of genius comes from combining diverse concepts in a way that no one has done before and sometimes these combinations are serendipitous. An author or inventor who is uninspired when staring at a blank page or computer screen (as in "writer's block") may be inspired to creative achievement by reading a text-morphed composition. As another application, text morphing may prove useful in the next generation of search methods. A search method that integrates and synthesizes information across multiple sources can provide more useful search results than a search method that is just limited to separate ranking and listing of individual sources. Also, as is the case with image morphing, text morphing may serve the purpose of entertaining and amusing people.

Review and Limitations of the Prior Art

There are many interesting methods in the prior art for processing text from single, and multiple text-based sources. However, none of these methods disclose morphing together substantive content from two or more text-based sources as is done by the invention that is disclosed herein. As an organizing construct for this review, text-processing methods may be classified into four general categories: (1) methods to create a summary of a single source; (2) methods to modify a single document by phrase substitution; (3) methods to combine content from multiple sources using templates; and (4) methods to combine content from multiple sources without templates. We now discuss these general method categories, including their limitations and some examples thereof.

1. Methods to Create a Summary of a Single Source

There are methods in the prior art to create a summary (or an abstract or targeted excerpt) of a single text-based source. These methods can also be applied to multiple text-based sources to create a separate summary for each of several sources. Such methods are useful for a variety of applications, including creating document summaries for research review purposes or for display of search engine results. However, such methods do not morph together content between two or more text-based sources. Examples in the prior art that appear to use such document-summarizing methods include the following U.S. Pat. No. 6,865,572 (Boguraev et al., 2005; "Dynamically Delivering, Displaying Document Content as Encapsulated Within Plurality of Capsule Overviews with Topic Stamp"); U.S. Pat. No. 7,292,972 (Lin et al., 2007; "System and Method for Combining Text Summarizations"); and U.S. Pat. No. 7,587,309 (Rohrs et al., 2009; "System and Method for Providing Text Summarization for Use in Web-Based Content").

2. Methods to Modify a Single Document by Phrase Substitution

There are methods in the prior art to modify a single document by selectively substituting alternative phrases (single words or multiple word combinations) for the phrases that were originally used in the document. For example, the alternative phrases may be similar in meaning, but different in style or complexity, as compared to the original phrases used in the document. Such methods are useful for a variety of applications, including rewriting documents for different audiences or purposes. However, such methods do not morph together substantive content between two or more text-based sources.

Examples in the prior art that appear to use phrase substitution methods include the following U.S. Pat. No. 4,456,973 (Carlgren et al., 1984; "Automatic Text Grade Level Analyzer for a Text Processing System"); U.S. Pat. No. 4,773,039 (Zamora, 1988; "Information Processing System for Compaction and Replacement of Phrases"); U.S. Pat. No. 7,113,943 (Bradford et al., 2006; "Method for Document Comparison and Selection"); U.S. Pat. No. 7,472,343 (Vasey, 2008; "Systems, Methods and Computer Programs for Analysis, Clarification, Reporting on and Generation of Master Documents for Use in Automated Document Generation"); U.S. Pat. No. 7,599,899 (Rehberg et al., 2009; "Report Construction Method Applying Writing Style and Prose Style to Information of User Interest"); U.S. Pat. No. 7,621,562 (Kacmarcik et al., 2009; "Obfuscating Document Stylometry"); and U.S. Pat. No. 7,640,158 (Detlef et al., 2009; "Automatic Detection and Application of Editing Patterns in Draft Documents"). Such examples also appear to include U.S. patent applications: 20070100823 (Inmon, 2007; "Techniques for Manipulating Unstructured Data Using Synonyms and Alternate Spellings Prior to Recasting as Structured Data"); 20090094137 (Toppenberg et al., 2009; "Web Page Optimization Systems"); 20090217159 (Dexter et al., 2009; "Systems and Methods of Performing a Text Replacement Within Multiple Documents"); and 20090313233 (Hanazawa, 2009;

"Inspiration Support Apparatus Inspiration Support Method and Inspiration Support Program").

3. Methods to Combine Content from Multiple Sources Using Templates

There are methods in the prior art that use templates to combine content from multiple text-based sources into a single standard-format report or some other standardized document. For example, a standardized sales report may be created by extracting sales information from multiple sources to "fill in the blanks" of a template for a standardized sales report. There are many useful applications for such methods, but they are limited to the particular subject domains for which templates are created. They do not provide a generalizable, flexible method for morphing together content between two or more text-based sources across a wide variety of subject domains and applications. Examples in the prior art that appear to use templates to combine content from multiple text-based sources include: U.S. Pat. No. 7,627,809 (Balinsky, 2009; "Document Creation System and Related Methods"), U.S. Pat. No. 7,689,899 (Leymaster et al., 2010; "Methods and Systems for Generating Documents"), and U.S. Pat. No. 7,721,201 (Grigoriadis et al., 2010; "Automatic Authoring and Publishing System"); as well as U.S. patent application 20100070448 (Omoigui, 2010; "System and Method for Knowledge Retrieval, Management, Delivery and Presentation").

4. Methods to Combine Content from Multiple Sources without Templates

There are methods in the prior art that combine, to some extent, content from multiple text-based sources in some fashion without using a template. U.S. Pat. No. 5,953,718 (Wical, 1999; "Research Mode for a Knowledge Base Search and Retrieval System") uses point of view "gists" from different documents to create a synopsis. U.S. Pat. No. 6,847,966 (Sommer et al., 2005; "Method and System for Optimally Searching a Document Database Using a Representative Semantic Space") uses "pseudo-document vectors" to represent hypothetical documents. U.S. Pat. No. 7,366,711 (McKeown et al., 2008; "Multi-Document Summarization System and Method") performs temporal processing on phrases from different documents in order to generate a summary. U.S. Pat. No. 7,548,913 (Ekberg et al., 2009; "Information Synthesis Engine") organizes excerpts from, and hyperlinks to, different documents. U.S. Patent Application 20090193011 (Blair-Goldensohn et al., 2009; "Phrase Based Snippet Generation") generates a snippet with a plurality of sentiments about an entity from different review sources. U.S. Patent Application 20090292719 (Lachtarnik et al., 2009; "Methods for Automatically Generating Natural-Language News Items from Log Files and Status Traces") automatically generates natural-language news items from log files. These are interesting and useful methods. However, none of these methods flexibly morphs together the substantive content of two or more text-based sources as does the invention that we will now disclose herein.

SUMMARY OF THE INVENTION

This invention is a method for "text morphing," wherein text morphing involves integrating or blending together substantive content from two or more bodies of text into a single body of text based on locations of linguistic commonality among the two or more bodies of text. This method entails: creating a database with sets of phrase synonyms; identifying pairs of "Synonym-Different-Synonym" (SDS) text segments between an import body of text and an export body of text, wherein these pairs of SDS text segments share starting phrases that are phrase synonyms, share ending phrases that are phrase synonyms, and have middle portions that are not phrase synonyms; and, for each selected pair of SDS text segments, substituting some or all of the SDS text segment from the export body of text for some or all of the SDS text segment in the import body of text. In some respects, this method is analogous to splicing and substituting gene segments with compatible starting and ending sequences, but different middle sequences.

INTRODUCTION TO THE FIGURES

These figures show different examples of how this invention may be embodied, but do not limit the full generalizability of the claims.

FIG. 1 shows: a database of phrase synonyms; a body of "import text" into which text content is imported in the text morphing process; a body of "export text" from which text content is exported in the text morphing process; and key relationships among phrases in the database, the import text, and the export text that are used in the process of morphing text content.

DETAILED DESCRIPTION OF THE FIGURES

Figure 1:
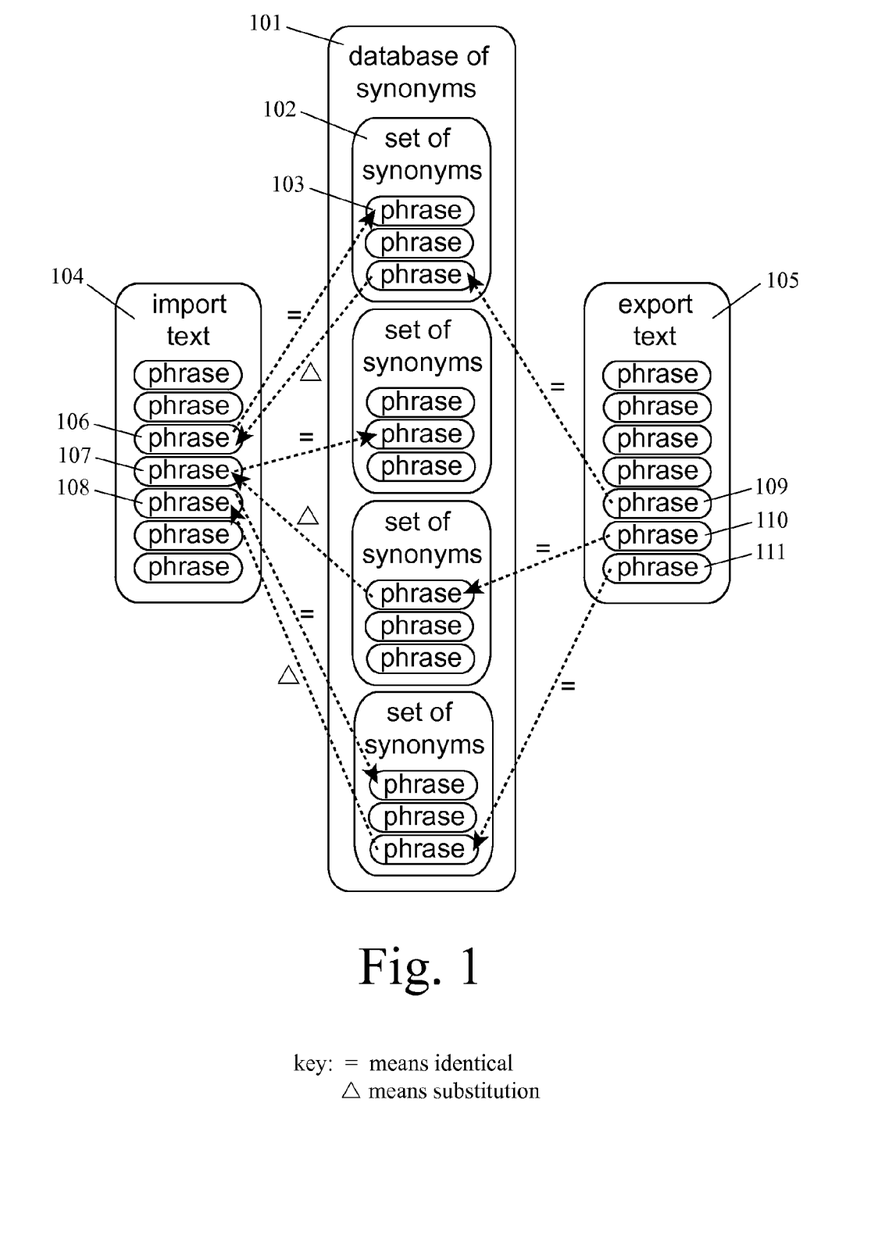
FIG. 1 shows a conceptual diagram that provides context for understanding the embodiments of text content morphing that are shown in FIGS. 2 and 3.
Figure 2:
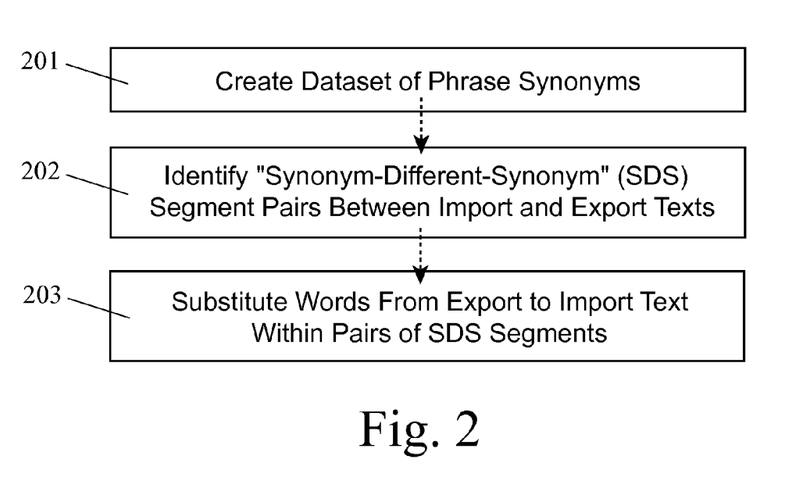
FIG. 2 shows a flow diagram for one embodiment of this method for morphing text content. Steps in this flow diagram include: creating a dataset of phrase synonyms; identifying "Synonym-Different-Synonym" (SDS) text segment pairs between the import and export texts; and substituting words from the export text into the import text within pairs of SDS segments.
Figure 3:
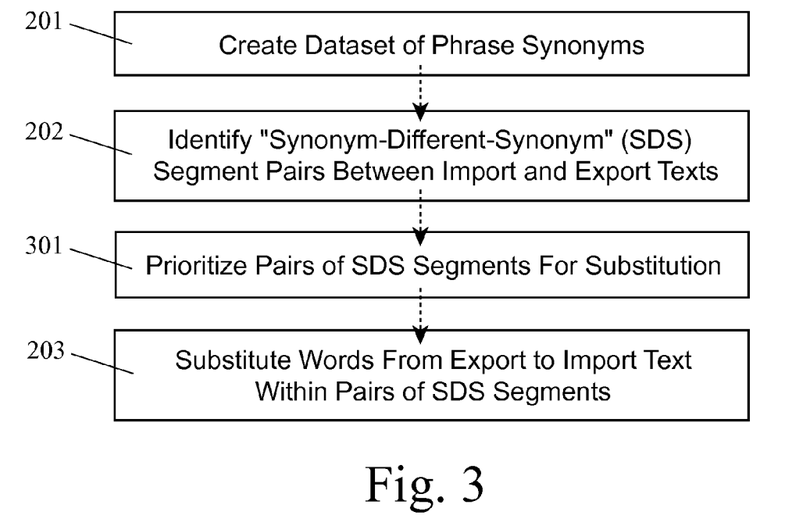
FIG. 3 shows a flow diagram for an embodiment of this method that is the same as the embodiment in FIG. 2 except that pairs of SDS segments are analyzed and prioritized before ordered or selective substitution.

These figures show different examples of how this invention may be embodied. However, these examples are not exhaustive and these figures do not limit the full generalizability of the claims. FIG. 1 shows a conceptual diagram that provides useful context for the embodiments, of the method of morphing text content claimed herein, for which flow diagrams are shown in FIGS. 2 and 3.

The vertical rounded rectangle shown in the center of FIG. 1 represents a database (101) of phrase synonyms. A phrase is defined herein as a character string including one or more words, numbers, abbreviations or combinations thereof. A set of phrase synonyms is defined herein as a set of phrases in which there is at least one phrase in the set for which all other phrases in the set can be substituted in text usage without causing significant changes in the meaning of the text or grammatical errors in the text.

In the embodiment that is shown in FIG. 1, all of the phrases in a set are bi-directionally substitutable. "Bi-directionally substitutable" means that any phrase a given set of synonyms can be substituted for any other phrase in that set, without causing significant changes in meaning or grammatical errors in the text in which the phrase is used. In an alternative embodiment, some of the substitution relationships in a given set may be unidirectional, as long as unidirectionality is recognized in the database so that phrase substitutions are only made in the proper direction.

FIG. 1 shows sets of phrase synonyms (including set 102) within dataset 101 and phrases (including phrase 103 within set 102) within each set. For the'sake of diagrammatic simplicity, database 101 in FIG. 1 only has four sets of phrase synonyms and each set only has three phrases. In actual use, a database of phrase synonyms would likely have hundreds of thousands of sets of phrase synonyms and the number of phrases in each set would vary greatly.

Different record structures may be used to store sets of phrase synonyms and the exact record structure is not central to this method, so the exact structure of the database is not specified. In this embodiment, phrases in the database include capitalization (lower and upper case letters) and non-alphanumeric characters (including punctuation). In an alternative embodiment, all letters may be converted to upper case and all non-alphanumeric characters may be deleted. In this embodiment, phrases in the database are developed for general use across many different topic areas and text structures. In an alternative embodiment, phrases in the database may be targeted for a specialized topic area or text structure.

The vertical rounded rectangle on the left side of FIG. 1 represents "import text" (104), which is a body of text into which phrases are substituted. Import text 104 contains sequential phrases, including sequential phrases 106, 107, and 108. Sequential phrases are shown in a vertical stack rather than a horizontal sequence in FIG. 1 to avoid the confusion of intersecting arrows in the figure. For the sake of diagrammatic simplicity, import text 104 in FIG. 1 is comprised of only seven sequential phrases. In actual use, import text may be comprised of a large number (tens, hundreds, thousands or more) of sequential phrases. Each of the various phrases that comprise import text 104 may or may not be found in database 101.

The vertical rounded rectangle on the right side of FIG. 1 represents "export text" (105), which is a body of text from which phrases are extracted for substitution into import text 104. Export text 105 contains sequential phrases, including sequential phrases 109, 110, and 111. Sequential phrases are shown in a vertical stack rather than a horizontal sequence in FIG. 1 to avoid the confusion of intersecting arrows in the figure. For the sake of diagrammatic simplicity, export text 105 in FIG. 1 is comprised of only seven sequential phrases. In actual use, export text may be comprised of a large number (tens, hundreds, thousands or more) of sequential phrases. Each of the various phrases that comprise export text 105 may or may not be found in database 101.

In this embodiment, capitalization (lower and upper case letters) and non-alphanumeric characters (including punctuation) are not modified in the import or export texts. In an alternative embodiment, if all letters have been converted to upper case and all non-alphanumeric characters have been deleted in phrases in the database, then similar modifications are made to the import and export texts before processing for substitutions.

As a step in the method of morphing text content that is claimed in this application, pairs of "Synonym-Different-Synonym" (SDS) text segments are identified between the import text and the export text. A pair of "Synonym-Different-Synonym" (SDS) segments is defined as two text segments in which: (a) one text segment is in the import body of text and the other text segment is in the export body of text; (b) the starting phrase for the text segment in the import body of text is substitutable in the same set of phrase synonyms as the starting phrase for the text segment in the export body of text; (c) the end phrase for the text segment in the import body of text is substitutable in the same set of phrase synonyms as the ending phrase for the text segment in the export body of text; and (d) the middle text between the starting phrase and the ending phrase of the text segment in the import body of text is not a phrase in the same set of phrase synonyms (nor a sequence of phrases in the same sets, respectively) as the middle text between the starting phrase and the ending phrase of the text segment in the export body of text.

In addition to the rectangular elements representing the database, sets, phrases, import text, and export text, FIG. 1 also shows dashed arrows that connect phrases between the import text, the database, and the export text. The symbol key at the bottom of FIG. 1 explains that arrows labeled with an equal sign ("=") mean that the connected phrases are identical and arrows labeled with a delta ("Δ") indicate phrase substitution. Phrase substitution is directional. The phrase at the foot of the dashed arrow line is substituted for the phrase at the arrowhead. Phrase identification occurs before phrase substitution, although, in some embodiments, phrase identification and substitution can occur in multiple iterations.

In the example shown in FIG. 1, the text segment composed of sequential phrases 106, 107, and 108 in the import text and the text segment composed of sequential phrases 109, 110, and 111 in the export text are identified as a pair of "Synonym-Different-Synonym" (SDS) segments by the relationships among their phrases. Specifically, phrase 106 in the import text is substitutable in the same set of phrase synonyms (in the database) as phrase 109 in the export text, phrase 108 in the import text is substitutable in the same set of phrase synonyms (in the database) as phrase 111 in the export text, and phrase 107 (the "middle text" of the segment) in the import text is not a phrase in the same set of phrase synonyms (in the database) as phrase 110 in the export text.

In the embodiment shown in FIG. 1, the import body of text is searched for SDS segments and, for each SDS segment that is found, the export body of text is searched for a paired segment. In alternative embodiments, search and identification could be done in a different order and still achieve the same results. For example, one could first search through the entire import and export texts for SDS segments, record the results in a hash table with one column for the import text and one column for the export text, and then match SDS pairs later.

In the embodiment shown in FIG. 1, the import body of text and the export body of text are relatively similar in size. In an alternative embodiment, the export text may be a large combined collection of text sources. Morphing between two text sources of relatively similar size has a greater chance of producing a synthesized morph composition with meaning and cohesion, but morphing with a very large export text has a greater chance of producing novel and inspiring concept combinations.

As another step in the method of morphing text content that is claimed in this application, within each pair of one or more pairs of SDS segments, some or all of a SDS segment from the export body of text is substituted for some or all of the SDS segment in the import body of text. In the example shown in FIG. 1, all of the SDS segment from the export body (phrases 109, 110, and 111) is substituted for all of the SDS segment in the import body (phrases 106, 107, and 108). In other embodiments of this method for text morphing, only the middle text portion (between the starting and ending phrases) of the SDS segment in the export body of text may be substituted for the middle text portion (between the starting and ending phrases) of the SDS segment in the import body of text.

For the sake of diagrammatic simplicity, FIG. 1 shows only one pair of SDS segments identified between the import and export texts. In practice, many pairs of SDS segments may identified, analyzed, and prioritized for ordered and/or selective intra-pair substitution. For example, some categories of SDS pairs may receive a higher priority ranking and be substituted first, while other categories of SDS pairs receive a lower priority ranking and are substituted later. Some categories of SDS pairs with priority rankings below a certain threshold may not be substituted at all. It is also possible to have substitutions occur in an iterative manner until process or outcomes criteria are met. For example, substitution cycles may repeat iteratively until a desired percentage of characters or words have been substituted from the export text into the import text. Similarly, in alternative embodiments of this method, the percentage of pairs of SDS segments for which substitution occurs may be varied in a manner analogous to varying the mix of image A vs. image B when morphing images A and B together.

In the embodiment shown in FIG. 1, phrase substitution only occurs within pairs of SDS segments. In a variation of this method, phrases to be substituted may be identified by analyzing pairs of SDS segments, but may be implemented throughout the import body of text. For example, the text in the middle portion of the SDS segment in the export text may be substituted for each occurrence, anywhere in the import text, of the text in the middle portion of the SDS segment in the import text. This broader phrase substitution variation will create more extensive morphing of the import text.

In some respects, morphing text content by this method is analogous to morphing images together or splicing genes together. When morphing images, one identifies pairs of points across different images A and B. These pairs of points create a common structural framework for blending images A and B into a single morphed image. The starting and ending phrases in SDS segments serve a similar purpose for morphing text content. The starting and ending phrases in SDS segments create a common structural framework for blending the text content of the import and export texts. Also, when splicing genes from two organisms in genetic engineering, one identifies pairs of gene segments from organisms A and B that share compatible starting and ending segments, but have different middle segments. The compatible starting and ending segments create a common structural framework for splicing together gene segments between organisms A and B.

When morphing images together, there is no guarantee that blending images A and B together will create an image that is meaningful, logical, or useful. One is more likely to create a blended image that is meaningful, logical, or useful when images A and B have similarities, such as both A and B being facial images. However, even morphing very dissimilar images into blended results that are somewhat disjointed in their raw form can ultimately prove to be meaningful, useful, or entertaining when interacted with human creativity and imagination. Sometimes a stroke of genius comes from connecting two diverse concepts or objects in creative ways that no one has thought of before. Image morphing is a useful tool even if it does not always create a logical combined image each time that it is used.

When morphing genes together, there is no guarantee that splicing genes from organisms A and B together will create a new organism that is functional or successful. One is more likely to create a new organism that is functional or successful when organisms A and B have similarities or are intentionally selected to create a desired result when combined. However, even morphing very dissimilar organisms into a new organism that is somewhat strange can ultimately prove to be useful when interacted with human creativity and imagination. Genetic engineering is a useful tool even if it does not always create a functional and successful new organism each time that it is used.

By analogy to image morphing and genetic engineering, there is no guarantee that morphing the content of different texts together will synthesize a meaningful and useful new text composition each time that it is used. Like morphing an image of a face with an image of a car, morphing text content between import and export texts with little in common is less likely to create a meaningful and useful new composition. However, like morphing two face images, morphing text content between import and export texts with structural and/or content similarities is more likely to create meaningful and useful new compositions. Also, even morphing together very dissimilar import and export texts can ultimately prove to be useful when the results are interacted with human creativity and imagination.

Although there are analogies between morphing text content using the method claimed herein and methods for morphing images or genes, the interdisciplinary distance between these subject areas, the dramatically-different processes involved, and the apparent lack of such connections in the prior art strongly suggest that the novel method for morphing text claimed herein is a non-obvious inventive step over image morphing and genetic engineering.

FIG. 2 shows a flow diagram for one embodiment of this method for morphing text content. The flow diagram in FIG. 2 starts with the creation (201) of a dataset that contains sets of phrase synonyms. In this embodiment, all the phrases in a set are bi-directionally substitutable, meaning that any phrase in a given set of phrase synonyms can be substituted for any other phrase in that set without causing significant changes in meaning or grammatical errors in the text in which the phrase is used. In alternative embodiments, some or all of the substitution relationships in a given set may be unidirectional, as long as the structure of the database recognizes this so that phrase substitutions are only done in the proper direction.

There are different ways to create a database of synonyms and the exact method of database creation is not central to this method, so the method of database creation is not specified. Similarly, different record structures may be used to store information on sets of phrase synonyms and the exact record structure is not central to this method, so the exact structure of the database is not specified. In this embodiment, phrases in the database include capitalization (lower and upper case letters) and non-alphanumeric characters (including punctuation). In an alternative embodiment, all letters may be converted to upper case and all non-alphanumeric characters may be deleted. In this embodiment, phrases in the database are developed for general use for many different topic areas and text structures. In an alternative embodiment, phrases in the database may be targeted for a specialized topic area or text structure.

The flow diagram in FIG. 2 goes on with the identification (202) of pairs of "Synonym-Different-Synonym" (SDS) text segments. A pair of "Synonym-Different-Synonym" (SDS) segments is defined as two text segments in which: (a) one text segment is in the import body of text and the other text segment is in the export body of text; (b) the starting phrase for the text segment in the import body of text is substitutable in the same set of phrase synonyms as the starting phrase for the text segment in the export body of text; (c) the end phrase for the text segment in the import body of text is substitutable in the same set of phrase synonyms as the ending phrase for the text segment in the export body of text; and (d) the middle text between the starting phrase and the ending phrase of the text segment in the import body of text is not a phrase in the same set of phrase synonyms (nor a sequence of phrases in the same sets, respectively) as the middle text between the starting phrase and the ending phrase of the text segment in the export body of text.

In the embodiment shown in FIG. 2, the import body of text is searched for SDS segments and, for each SDS segment that is found, the export body of text is searched for a paired segment. In alternative embodiments, search and identification could be done in a different order and still achieve the same results. For example, one could first search through the entire import and export bodies for SDS segments, record the results in a hash table with one column for the import text and one column for the export text, and then match SDS pairs.

The final step in the flow diagram in FIG. 2 involves substituting (203), across one or more pairs of SDS segments, within each pair of SDS segments, some or all of the SDS segment from the export body of text for some or all of the SDS segment in the import body of text. In this embodiment, substitutions occur for all pairs of SDS segments and, for each pair, the entire SDS segment from the export body of text is substituted for the entire SDS segment in the import body of text. In an alternative embodiment, the percentage of pairs of SDS segments for which substitution occurs may be varied in a manner analogous to varying the mix of image A vs. image B when morphing images A and B together. In another alternative embodiment, only the middle text portion (between the starting and ending phrases) of the SDS segment in the export body of text may be substituted for the middle text portion (between the starting and ending phrases) of the SDS segment in the import body of text.

In the embodiment of this method that was just discussed, phrase substitution only occurs within pairs of SDS segments. In a variation of this method, phrases to be substituted may be identified by analyzing pairs of SDS segments, but may be implemented throughout the import body of text. For example, the text in the middle portion of the SDS segment in the export text may be substituted for each occurrence, anywhere in the import text, of the text in the middle portion of the SDS segment in the import text. This broader phrase substitution variation will create more extensive morphing of the import text.

FIG. 3 shows a flow diagram for an embodiment of this method for morphing text content that is the same as the embodiment in FIG. 2 except that, in added step 301, pairs of SDS segments are analyzed and prioritized before ordered or selective substitution. For example, some categories of SDS pairs may receive a higher priority ranking and be substituted first; other categories of SDS pairs may receive a lower priority ranking and be substituted later. As another example, categories of SDS pairs with priority rankings below a certain threshold may not be substituted at all. It is also possible to have substitutions occur in an iterative manner until process or outcomes criteria are met. For example, substitution cycles may repeat iteratively until a desired percentage of characters or words have been substituted from the export text into the import text.

In various examples, SDS segments may be analyzed and prioritized based on one or more of the following factors: (a) whether, in one or both of the SDS segments in the import body of text and export body of text, the middle text is a single phrase found in the database or a sequence of phrases that are each found in the database; (b) whether, in one or both of the SDS segments in the import body of text and export body of text, the middle text has relatively few characters or words; (c) whether, in one of the SDS segments in the import body of text and export body of text, the middle text has words or phrases that are relatively frequent in its parent body of text or relatively infrequent in the other body of text; and (d) whether, in one or both of the SDS segments in the import body of text and export body of text, the middle text has words or phrases that are relatively infrequent in a larger universe of text sources.

Giving higher priority to substitutions in which the middle text in an SDS segment is a single phrase found in the database (or a sequence of phrases that are each found in the database) will tend to maintain better grammatical structure than substitutions in which this criterion is not met. Giving higher priority to substitutions in which the middle text has relatively few characters or words will help to avoid run-on sentences and disjointed composition. Giving higher priority to substitutions in which the middle text has words or phrases that are relatively frequent in its parent body of text or relatively infrequent in the other body of text will better ensure the inclusion of the most unique elements of the import and export texts in the morphed synthesis. Giving higher priority to substitutions wherein the middle text has words or phrases that are relatively infrequent in a larger universe of text sources will also help ensure inclusion of relatively unique elements from the import and export texts in the morphed composition.

Figure 4:
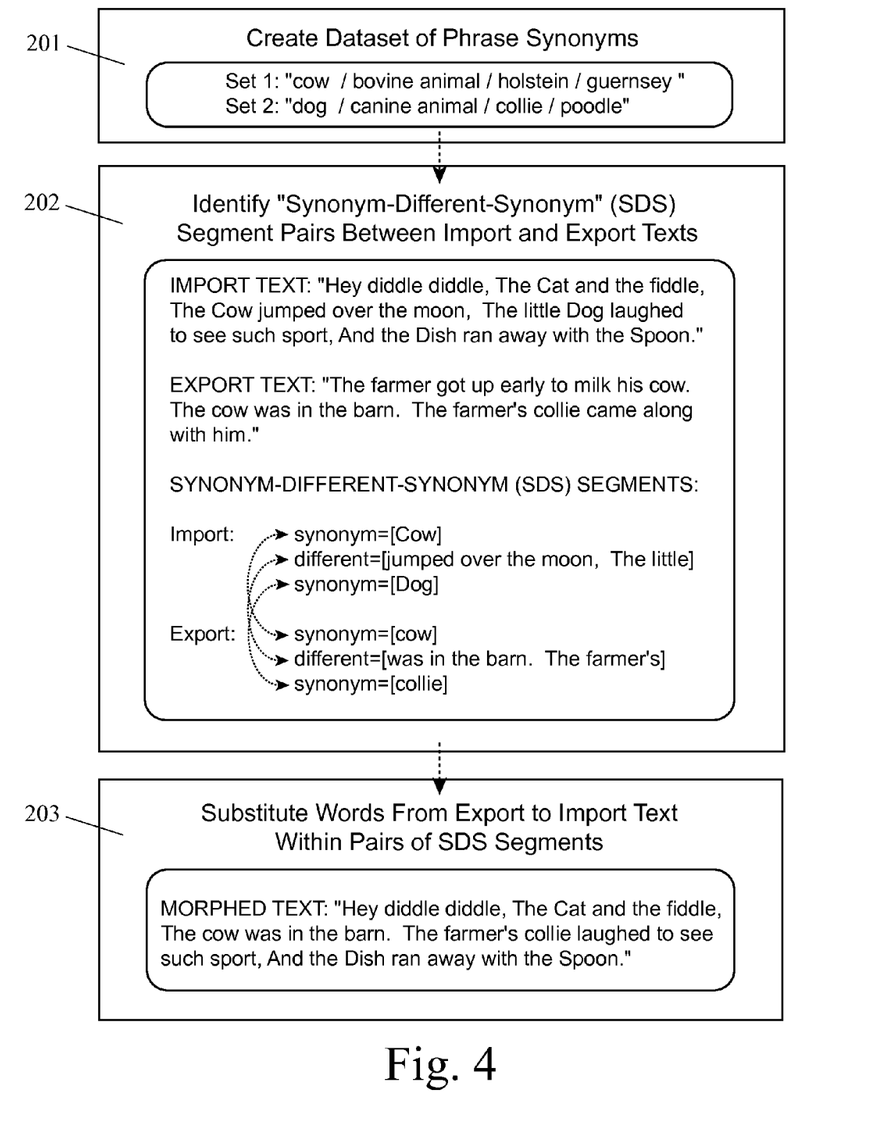
FIG. 4 shows an example, including words, of the embodiment shown in FIG. 2.

FIG. 4 shows an example, including words, of the embodiment shown in FIG. 2. The import text in this example is the old nursery rhyme about the cow jumping over the moon—"Hey diddle diddle, The Cat and the fiddle, The Cow jumped over the moon, The little Dog laughed to see such sport, And the Dish ran away with the Spoon." The export text is a short bit of prose about a farmer going out to milk a cow with his collie—"The farmer got up early to milk his cow. The cow was in the barn. The farmer's collie came along with him."

There are only two sets of phrase synonyms in this simple example. The first set includes the word "cow," which is found in both the import text and the export text. The word "cow" is the "synonym" starting point for the "Synonym-Different-Synonym" segment that is substituted from the export text to the import text in this example. The second set includes the words "dog" and "collie," which are found in the import text and the export text, respectively. These words are the "synonym" ending points for the "Synonym-Different-Synonym" segment that is substituted from the export text to the import text in this example.

In between these two sets of synonyms, there are different phrases in the import text and the export text. The middle phrase in the import text is—"jumped over the moon, The little"—and the middle phrase in the export text is—"was in the barn. The farmer's". In this example, morphing the import and export texts together with this single SDS substitution yields the following morphed text—"Hey diddle diddle, The Cat and the fiddle, The cow was in the barn. The farmer's collie laughed to see such sport, And the Dish ran away with the Spoon." This simple example shows how text morphing creates a new body of text that combines (morphs together) different elements of the import text and the export text. This is analogous to the way in which image morphing creates a new image that combines (morphs together) different elements of two parent images.

I claim:

1. A method for morphing text content comprising:
   creating a database with sets of phrase synonyms,
      wherein a phrase is a character string including one or more words, numbers, abbreviations or combinations thereof, and
      wherein a set of phrase synonyms is a set of phrases in which there is at least one phrase in the set for which all other phrases in the set can be substituted in text usage without causing significant changes in the meaning of the text or grammatical errors in the text, and wherein when a first phrase is determined to be substitutable for a second phrase according to the set of phrase synonyms, the first phrase and the second phrase are synonymous;

receiving an import body of text;

receiving an export body of text;

identifying pairs of "Synonym-Different-Synonym" (SDS) text segments between the import body of text and the export body of text, wherein a pair of "Synonym-Different-Synonym" (SDS) segments is defined as two text segments in which:

one text segment is in the import body of text and the other text segment is in the export body of text, the import body of text and the export body of text each including text in addition to the SDS segment;

the starting phrase (S) for the SDS segment in the import body of text is synonymous to the starting phrase for the SDS segment in the export body of text;

the end phrase (S) for the SDS segment in the import body of text is synonymous to the ending phrase for the SDS segment in the export body of text; and the middle text (D) between the starting phrase and the ending phrase of the SDS segment in the import body of text is not synonymous to the middle text between the starting phrase and the ending phrase of the text segment in the export body of text; and substituting, within each pair of one or more pairs of SDS segments, some or all of the SDS segments from the export body of text for some or all of the SDS segments in the import body of text to obtain a morphed text comprising the import body of text and portions of the export body of text, wherein such substitutions do not cumulatively change all of the words in the import text, wherein the import text and the export text are sentences, and wherein pairs of SDS segments are analyzed and prioritized higher for ordered and/or selective intra-pair substitution when, in one or both of the SDS segments in the import body of text and the export body of text:

the middle text is a single phrase found in the database, the middle text has relatively few characters or words, the middle text has words or phrases that are infrequent in the other body of text, or the middle text has words or phrases that are infrequent in a larger universe of text sources.

2. The method for morphing text content in claim 1 wherein pairs of SDS segments are analyzed and prioritized for ordered and/or selective intra-pair substitution.

3. The method for morphing text content in claim 1 wherein the database of phrase synonyms includes capitalization and non-alphanumeric characters.

4. A method for morphing text content comprising:

creating a database with sets of phrase synonyms, wherein a phrase is a character string including one or more words, numbers, abbreviations or combinations thereof, and wherein a set of phrase synonyms is a set of phrases in which there is at least one phrase in the set for which all other phrases in the set can be substituted in text usage without causing significant changes in the meaning of the text or grammatical errors in the text;

receiving an import body of text;

receiving an export body of text;

identifying pairs of "Synonym-Different-Synonym" (SDS) text segments between the import body of text and the export body of text, wherein a pair of "Synonym-Different-Synonym" (SDS) segments is defined as two text segments in which: one text segment is in the import body of text and the other text segment is in the export body of text; the starting phrase for the text segment in the import body of text is substitutable in the same set of phrase synonyms as the starting phrase for the text segment in the export body of text; the end phrase for the text segment in the import body of text is substitutable in the same set of phrase synonyms as the ending phrase for the text segment in the export body of text; and the middle text between the starting phrase and the ending phrase of the text segment in the import body of text is not a phrase in the same set of phrase synonyms as the middle text between the starting phrase and the ending phrase of the text segment in the export body of text;

analyzing and prioritizing pairs of SDS segments for ordered and/or selective intra-pair substitution of some or all of the SDS segment from the export body of text for some or all of the SDS segment in the import body of text; and substituting, within each pair of one or more pairs of SDS segments, some or all of the SDS segment from the export body of text for some or all of the SDS segment in the import body of text; wherein such substitutions occur in an iterative manner until the earlier of: (a) process or outcomes criteria are met; or (b) further substitutions would cause 100% of the words in the import text to have been changed.

5. The method for morphing text content in claim 4 wherein pairs of SDS segments are analyzed and prioritized higher for ordered and/or selective intra-pair substitution of some or all of a SDS from the export body of text for some or all of the SDS segment in the import body of text based on factors including one or more of the following:

in one or both of the SDS segments in the import body of text and the export body of text, the middle text is a single phrase found in the database;

in one or both of the SDS segments in the import body of text and the export body of text, the middle text has relatively few characters or words;

in one of the SDS segments in the import body of text and the export body of text, the middle text has words or phrases that are relatively infrequent in the other body of text; and in one or both of the SDS segments in the import body of text and the export body of text, the middle text has words or phrases that are relatively infrequent in a larger universe of text sources.

6. The method for morphing text content in claim 4 wherein the database of phrase synonyms includes capitalization and non-alphanumeric characters.

7. A method for morphing text content:

creating a database with sets of phrase synonyms, wherein a phrase is a character string including one or more words, numbers, abbreviations or combinations thereof, and wherein a set of phrase synonyms is a set of phrases in which there is at least one phrase in the set for which all other phrases in the set can be substituted in text usage without causing significant changes in the meaning of the text or grammatical errors in the text;

receiving an import body of text;

receiving an export body of text;

receiving a desired percentage of characters or words in the import text to be changed;

identifying pairs of "Synonym-Different-Synonym" (SDS) text segments between the import body of text and the export body of text, wherein a pair of "Synonym- Different-Synonym" (SDS) segments is defined as two text segments in which: one text segment is in the import body of text and the other text segment is in the export body of text; the starting phrase for the text segment in the import body of text is substitutable in the same set of phrase synonyms as the starting phrase for the text segment in the export body of text; the end phrase for the text segment in the import body of text is substitutable in the same set of phrase synonyms as the ending phrase for the text segment in the export body of text; and the middle text between the starting phrase and the ending phrase of the text segment in the import body of text is not a phrase in the same set of phrase synonyms as the middle text between the starting phrase and the ending phrase of the text segment in the export body of text;

analyzing and prioritizing pairs of SDS segments for ordered and/or selective intra-pair substitution, within each pair of one or more pairs of SDS segments, of some or all of a SDS segment from the export body of text for some or all of a SDS segment in the import body of text based on factors including one or more of the following: in one or both of the SDS segments in the import body of text and the export body of text, the middle text is a single phrase found in the database or a sequence of phrases that are each found in the database; in one or both of the SDS segments in the import body of text and the export body of text, the middle text has relatively few characters or words; in one of the SDS segments in the import body of text and the export body of text, the middle text has words or phrases that are relatively frequent in its body of text or relatively infrequent in the other body of text; and in one or both of the SDS segments in the import body of text and the export body of text, the middle text has words or phrases that are relatively infrequent in a larger universe of text sources; and substituting, within each pair of one or more pairs of SDS segments, some or all of the SDS segment from the export body of text for some or all of the SDS segment in the import body of text; wherein such substitutions occur in an iterative manner until the earliest of: (a) the desired percentage of characters or words in the import text has been changed by substitutions; (b) further substitutions would cause 100% of the words in the import text to have been changed; or (c) all possible substitutions using the database have occurred.

8. The method for morphing text content in claim 7 wherein the database of phrase synonyms includes capitalization and non-alphanumeric characters.

* * * * *